(No Model.) 3 Sheets—Sheet 2.
H. E. MOEBUS.
VEHICLE HUB.
No. 502,406. Patented Aug. 1, 1893.
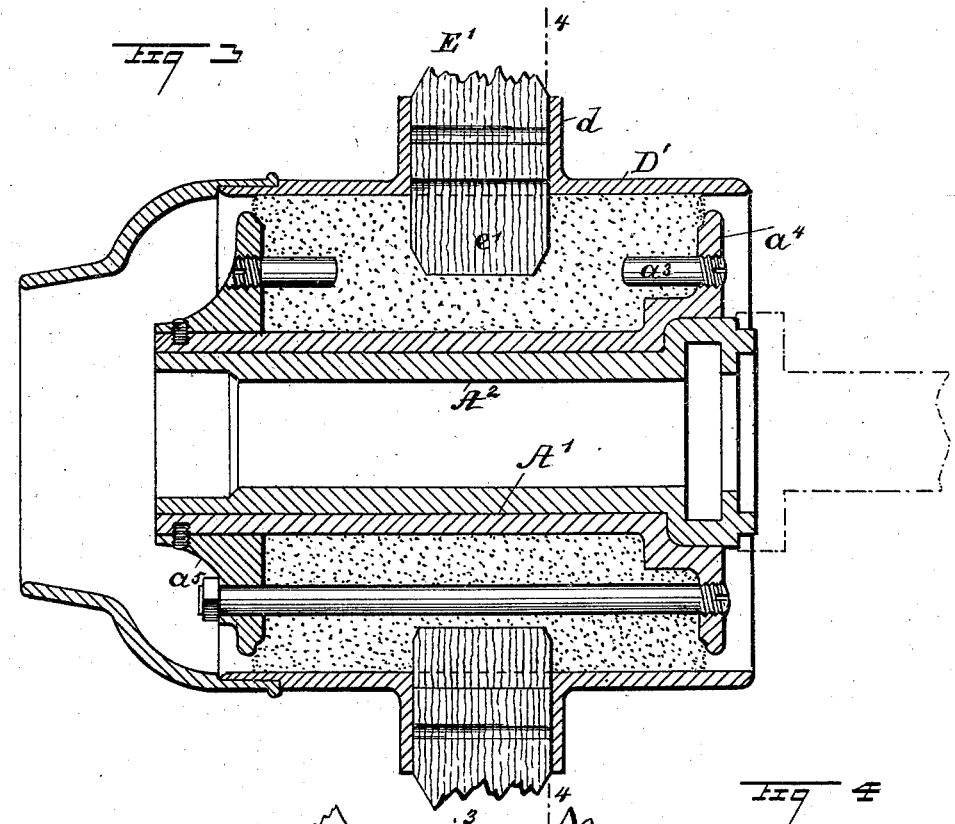
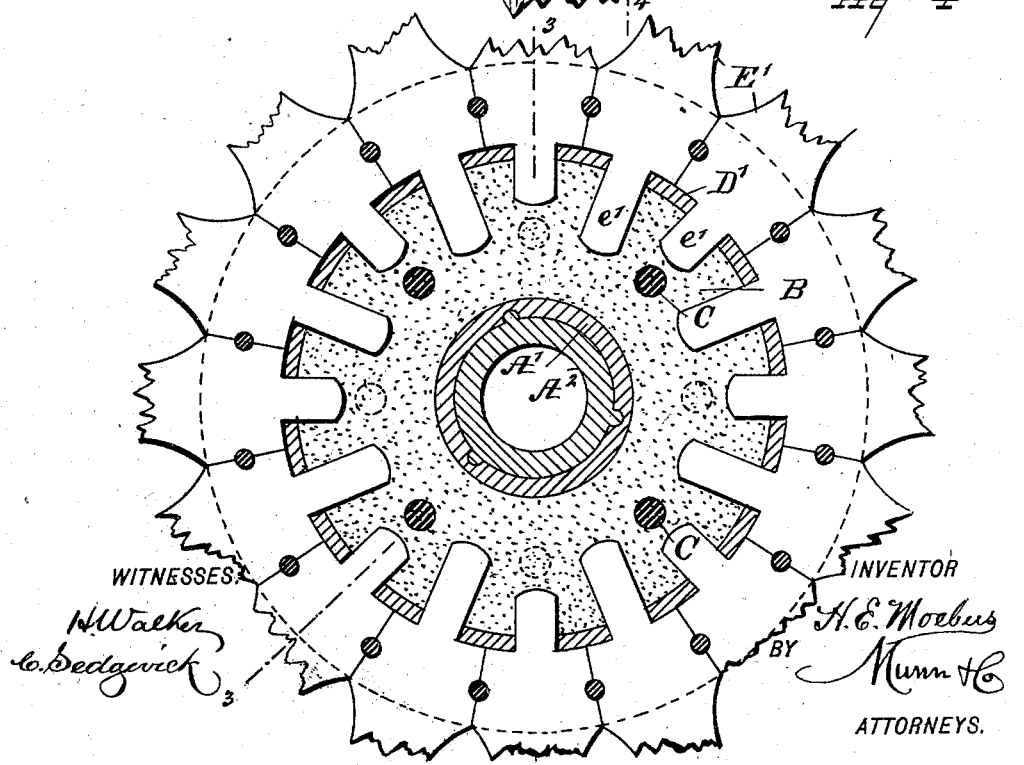
WITNESSES:
H. Walker
C. Sedgwick
INVENTOR
H. E. Moebus
BY
Munn & Co.
ATTORNEYS.

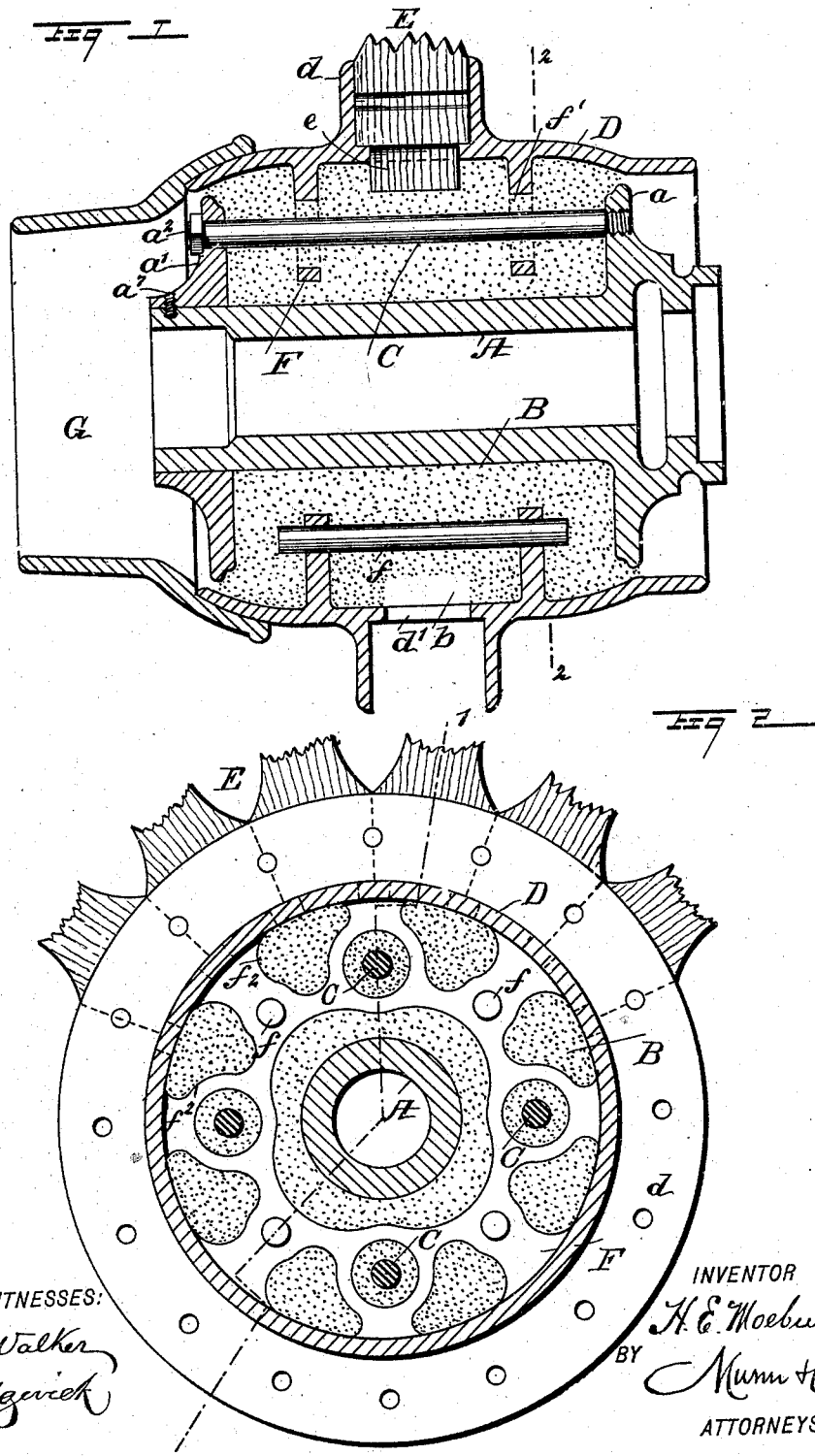

(No Model.) 3 Sheets—Sheet 3.

H. E. MOEBUS.
VEHICLE HUB.

No. 502,406. Patented Aug. 1, 1893.

WITNESSES:
H. Walker
C. Sedgwick

INVENTOR
H. E. Moebus
BY Munn & Co
ATTORNEYS.

UNITED STATES PATENT OFFICE.

HENRY EDWARD MOEBUS, OF WOODSTOCK, ONTARIO, CANADA.

VEHICLE-HUB.

SPECIFICATION forming part of Letters Patent No. 502,406, dated August 1, 1893.

Application filed November 26, 1892. Serial No. 453,228. (No model.)

*To all whom it may concern:*

Be it known that I, HENRY EDWARD MOEBUS, of Woodstock, in the Province of Ontario and Dominion of Canada, have invented a new and Improved Hub for Vehicles and other Wheels, of which the following is a full, clear, and exact description.

The invention relates to vehicle hubs in which an elastic filling is employed to take up the vibrations, and thereby render riding easier, and make vehicles more durable by lessening the jar.

The object of the invention is to provide an improved hub of this character, in which the filling of rubber is vulcanized to the axle box and to the hub-receiving shell, and interlocked with the said shell and with the spokes and with the box, to obtain a solid filling and also prevent any rotary movement of the filling or shell, independently of the box, and a further object is to permit the necessary longitudinal yielding of the hub, while preventing displacement of the parts.

Reference is to be had to the accompanying drawings forming a part of this specification, in which similar letters of reference indicate corresponding parts in all the figures.

Figure 5:
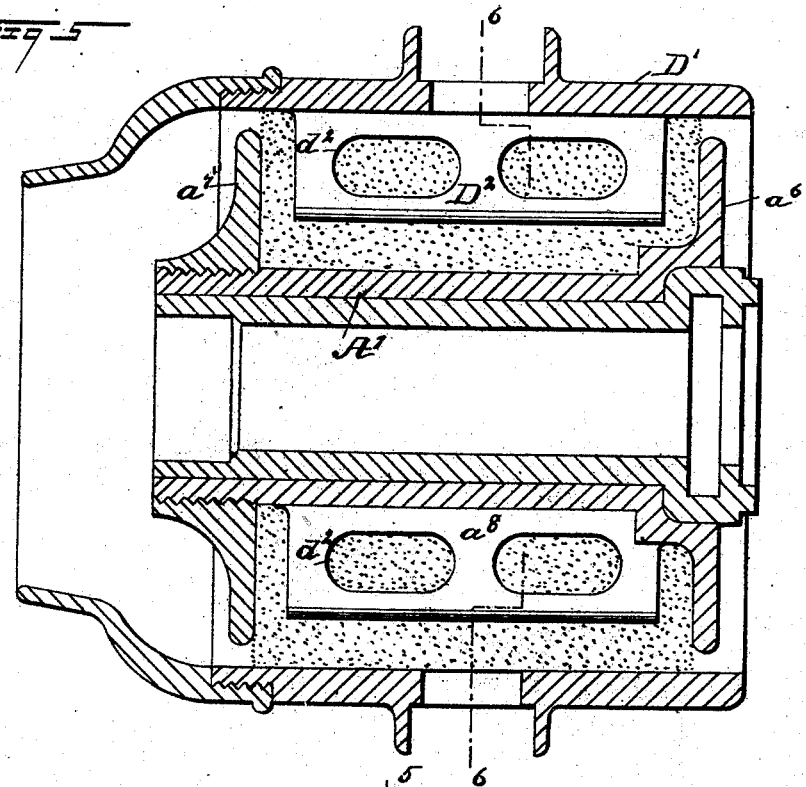
Figure 6:
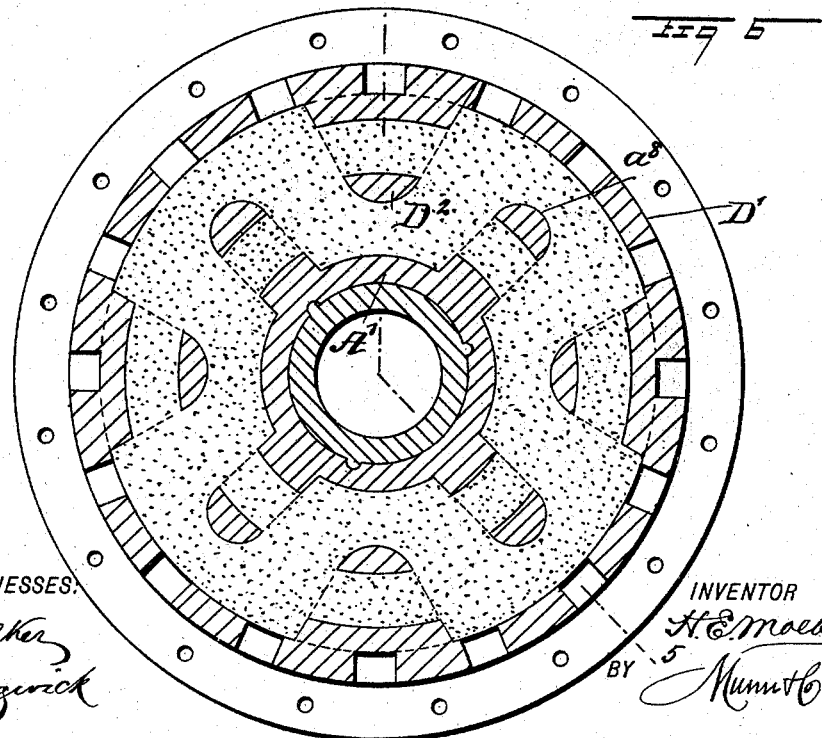

Figure 1 is a longitudinal sectional view of a hub embodying my invention, the section being taken on line 1—1, Fig. 2. Fig. 2 is a transverse section on line 2—2, Fig. 1. Fig. 3 is a longitudinal section on line 3—3, Fig. 4, showing a modification. Fig. 4 is a transverse sectional view of same, on line 4—4, Fig. 3; and Figs. 5 and 6 are respectively longitudinal and transverse sectional views showing a further modification.

Referring particularly to Figs. 1 and 2, the hub is provided with an axle box A, adapted to receive the axle spindle, and at its inner end an integral flange $a$ is formed. At the outer end a removable flange $a'$ is secured to the box, which flanges prevent endwise displacement of the rubber filling B, of the hub. In order that the rubber filling may interlock with the axle box, bolts C, are provided which extend longitudinally of the hub, passing through one flange of the box, as $a'$, and screwing into the other, as will be clearly understood from Fig. 1, the bolts thereby forming an attachment to, and virtually a part of, the box so that all rotary movement of the rubber relatively to the box is prevented. The bolts, outside of the flange $a'$ are provided with nuts $a^2$ by which the said flange is forced home on the axle box. Set screws $a^7$ may also be provided for securing the hub of the flange $a'$ to the axle box.

The outer shell D, of the hub is provided with spaced external flanges $d$, for receiving the spokes E, and between the flanges, apertures $d'$ are preferably formed in the shell in order that the tenons $e$ of the spokes or of some of them, may extend into recesses $b$ formed in the rubber filling B. On the shell D there are also formed spaced internal rings F, preferably of skeleton form in order that the rubber may take a better hold. Extending longitudinally of the hub, and connecting such internal flanges, are rods or bolts $f$, and by means of such flanges and rods, thus formed on or affixed to the shell, the rubber filling is caused to interlock with the shell, and prevent rotary movement of the latter relatively to the rubber. The flanges F, are formed with openings $f'$, through which the bolts C, of the axle box freely pass, and into these openings and the openings $f^2$ in the rings, the rubber extends. By thus effectively interlocking the rubber with the box and shell, the necessary lateral and vertical yielding is permitted while all undue longitudinal play or displacement is prevented.

An exterior cap G, is affixed to the hub in any approved manner.

In practice the shell and box of the hub are put together, and suitable molds and clamps are arranged thereon, including a form by which the recesses $b$ for the spoke tenons are formed, and the hub is filled with rubber, the removable flange $a'$ being tightened up by the nuts $a^2$ subsequently to entering the rubber filling, whereby the flanges and bolts are availed of to compact the filling. The hub is then placed in a vulcanizer to vulcanize the rubber.

In the form shown in Figs. 3 and 4, rotary movement of the shell D' relatively to the filling is prevented wholly by the tenons $e'$ of the spokes E', and rotary movement of the rubber relatively to the box is prevented by studs $a^3$ secured to the flanges $a^4$, $a^5$, of the said box, and extending into the rubber, toward each other, and by bolts C that alternate with said studs. In this form also, the box includes a thimble A', which is secured to the internal box $A^2$ by a groove and feather connection, the flanges $a^4$, $a^5$, being on the said thimble.

In the form shown in Figs. 5 and 6, there are formed on the thimble A' of the axle box radial ribs $a^8$ that extend longitudinally of the thimble, between the flanges $a^6$, $a^7$, which are the same as in Figs. 3 and 4, except that the flange $a^7$ is held in place by a threaded connection with the axle box, and on the outer spoke-receiving shell or casing D', there are formed internal ribs $D^2$ that alternate with the ribs $a^8$, and like the latter extend longitudinally of the hub between the flanges $a^6$ and $a^7$. The ribs $a^8$ and $D^2$ are formed with openings $d^2$ into which the rubber enters for taking proper hold, and such ribs terminate short of the flanges $a^6$, $a^7$, so that a considerable cushion of rubber will enter between said flanges and ribs, to insure that the hub readily recovers its normal condition after a side thrust such as may be occasioned by a car track. This cushion is also provided for at the inside of the flanges in the construction shown in the other figures.

In all cases the rubber is vulcanized both to the shell and box and interlocks with both, whereby the hub will be firm, and all looseness and abnormal movement will be prevented. In all cases also, undue friction between the metal parts in the yielding of the filling, is prevented.

Further, the flanges of the box in all the modifications, prevent all lateral displacement, while permitting the necessary yielding in response to side thrusts.

Having thus described my invention, what I claim as new, and desire to secure by Letters Patent, is—

1. The herein described hub, comprising an axle box, a spoke receiving shell, and an interposed filling of rubber vulcanized both to the box and shell, and interlocked to prevent rotary movement of either the box or shell relatively to the filling, substantially as described.

2. The herein described hub, comprising an axle box, a spoke receiving shell, and an interposed filling of rubber vulcanized both to the box and shell, and the box and shell being interlocked with the rubber to prevent rotary movement of either relatively to the rubber, the box having a fixed and a removable flange which prevents undue movement of the shell and filling longitudinally of the hub, substantially as described.

3. The herein described hub comprising an axle box having flanges, and bolts extending between said flanges, an outer shell having internal rings or flanges which are also united by bolts or rods, and an interposed filling of rubber vulcanized both to the shell and box, substantially as described.

4. The herein described hub, comprising a box having flanges, and provided with inwardly extending studs on said flanges, an exterior shell and an interposed filling of rubber vulcanized both to the shell and box, substantially as described.

5. The herein described hub comprising a box having flanges, and having radial ribs extending longitudinally of the hub between the flanges, an exterior shell having internal, longitudinal ribs also extending longitudinally between the box flanges, and alternating with the ribs of the box, and an interposed filling of rubber, vulcanized both to the box and shell, substantially as described.

6. The herein described hub comprising an axle box, an exterior spoke-receiving shell, and a filling of rubber, centrally of the hub and vulcanized both to the box and shell the said shell being free to move in the direction of the length of the hub, in response to side thrusts, and the rubber serving to permit also a yielding of the shell transversely of the hub, substantially as described.

HENRY EDWARD MOEBUS.

Witnesses:
J. L. MCAULIFFE,
C. SEDGWICK.